(12) United States Patent
Padmanabhan et al.

(10) Patent No.: US 8,773,946 B2
(45) Date of Patent: Jul. 8, 2014

(54) PORTABLE HOUSINGS FOR GENERATION OF BUILDING MAPS

(75) Inventors: Aravind Padmanabhan, Plymouth, MN (US); Steve Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 353 days.

(21) Appl. No.: 13/092,045

(22) Filed: Apr. 21, 2011

(65) Prior Publication Data

US 2012/0169530 A1 Jul. 5, 2012

Related U.S. Application Data

(60) Provisional application No. 61/428,530, filed on Dec. 30, 2010.

(51) Int. Cl.
*G01S 15/89* (2006.01)
(52) U.S. Cl.
USPC .............................................................. 367/7
(58) Field of Classification Search
USPC ................... 342/52–59, 146, 179–180, 191; 367/7–8, 88, 93–94, 99–100, 117
See application file for complete search history.

(56) References Cited

U.S. PATENT DOCUMENTS

| | | |
|---|---|---|
| 5,719,561 A | 2/1998 | Gonzales |
| 5,745,126 A | 4/1998 | Jain et al. |

(Continued)

FOREIGN PATENT DOCUMENTS

| | | |
|---|---|---|
| GB | 2441434 A | 3/2008 |
| JP | 11024735 | 1/1999 |

(Continued)

OTHER PUBLICATIONS

Engineering Acoustics, Inc., "Tactor Interface/Controller Advanced Evaluation Board Eval 2.0," 2 pages, prior to Apr. 30, 2010.

(Continued)

*Primary Examiner* — John B Sotomayor
(74) *Attorney, Agent, or Firm* — Seager Tufte Wickhem LLC

(57) ABSTRACT

A system and method are presented for producing a model of the interior of a building. The model is capable of receiving and dynamically incorporating input from various sources including, for example, existing static map data, data such as annotations and updates provided by persons on the scene but outside the building, and real-time data from sensors located on mobile persons or assets that are dynamically moving inside the building. In some cases, the moving persons or assets inside the building may carry a unit that emits sound or electromagnetic pulses, which reflect off the immediate surroundings in a particular room or portion of the building, and sense the reflected pulses. The reflections from relatively close features may arrive at the sensor more quickly than those from relatively distant features, so that temporal analysis of the reflected pulse may provide information about features in the building as a function of their distance away from the unit. Pulses may be emitted and received at multiple locations in a room or portion of the building. The reflected pulses may be analyzed, using specific time shifts that correspond to round-trip travel times in particular directions, so that the actual locations of features may be identified. By walking from room-to-room throughout the interior of a building and performing such analysis, much or all of the interior of a building may be mapped.

17 Claims, 7 Drawing Sheets

(56) References Cited

U.S. PATENT DOCUMENTS

| | | |
|---|---|---|
| 5,857,986 A | 1/1999 | Moriyasu |
| 6,006,161 A | 12/1999 | Katou |
| 6,334,211 B1 | 12/2001 | Kojima et al. |
| 6,710,706 B1 | 3/2004 | Withington et al. |
| 6,720,921 B2 | 4/2004 | Ripingill, Jr. et al. |
| 6,876,951 B2 | 4/2005 | Skidmore et al. |
| 6,924,787 B2 | 8/2005 | Kramer et al. |
| 6,965,312 B2 | 11/2005 | Lerg |
| 7,002,551 B2 | 2/2006 | Azuma et al. |
| 7,062,722 B1 | 6/2006 | Carlin et al. |
| 7,096,120 B2 | 8/2006 | Hull |
| 7,098,787 B2 * | 8/2006 | Miller ............... 340/539.18 |
| 7,102,510 B2 | 9/2006 | Boling et al. |
| 7,111,783 B2 | 9/2006 | Xi et al. |
| 7,132,928 B2 | 11/2006 | Perricone |
| 7,139,685 B2 | 11/2006 | Bascle et al. |
| 7,146,218 B2 | 12/2006 | Esteller et al. |
| 7,164,972 B2 | 1/2007 | Imhof et al. |
| 7,200,639 B1 | 4/2007 | Yoshida |
| 7,246,008 B2 | 7/2007 | Daubert et al. |
| 7,246,044 B2 | 7/2007 | Imamura et al. |
| 7,292,908 B2 | 11/2007 | Borne et al. |
| 7,301,648 B2 | 11/2007 | Foxlin |
| 7,304,442 B2 | 12/2007 | Colwell |
| 7,308,323 B2 | 12/2007 | Kruk et al. |
| 7,342,648 B2 | 3/2008 | Solomon et al. |
| 7,358,458 B2 | 4/2008 | Daniel |
| 7,359,840 B2 | 4/2008 | Akasaka et al. |
| 7,382,271 B2 * | 6/2008 | McFarland ........... 340/686.6 |
| 7,382,281 B2 | 6/2008 | Kavaler |
| 7,383,148 B2 | 6/2008 | Ahmed |
| 7,389,207 B2 | 6/2008 | Saitta |
| 7,420,510 B2 | 9/2008 | Kolavennu et al. |
| 7,496,445 B2 | 2/2009 | Mohsini et al. |
| 7,512,450 B2 | 3/2009 | Ahmed |
| 7,523,022 B2 | 4/2009 | Thomas et al. |
| 7,545,263 B2 | 6/2009 | Plocher et al. |
| 7,548,833 B2 | 6/2009 | Ahmed |
| 7,567,844 B2 | 7/2009 | Thomas et al. |
| 7,583,275 B2 | 9/2009 | Neumann et al. |
| 7,596,473 B2 | 9/2009 | Hansen et al. |
| 7,606,579 B2 | 10/2009 | Thacher |
| 7,610,910 B2 | 11/2009 | Ahmed |
| 7,612,832 B2 | 11/2009 | Zhang et al. |
| 7,664,574 B2 | 2/2010 | Imhof et al. |
| 7,683,793 B2 | 3/2010 | Li et al. |
| 7,715,980 B2 | 5/2010 | Bargeron et al. |
| 7,733,836 B2 | 6/2010 | Huseth |
| 7,764,220 B1 | 7/2010 | Samaniego |
| 7,774,075 B2 | 8/2010 | Lin |
| 7,777,666 B2 | 8/2010 | Gregory et al. |
| 7,830,250 B2 | 11/2010 | Huseth et al. |
| 7,898,468 B2 | 3/2011 | Samaniego et al. |
| 7,962,150 B2 * | 6/2011 | Hertzog et al. ............ 455/456.1 |
| 7,973,669 B2 | 7/2011 | Pham et al. |
| 7,982,614 B2 | 7/2011 | Holm et al. |
| 8,000,892 B2 | 8/2011 | Banerjee |
| 8,040,273 B2 | 10/2011 | Tomich et al. |
| 8,041,744 B2 | 10/2011 | Heikkonen et al. |
| 8,102,423 B2 | 1/2012 | Cheng |
| 8,289,390 B2 | 10/2012 | Aggarwal et al. |
| 8,306,748 B2 | 11/2012 | Huseth et al. |
| 8,352,218 B2 | 1/2013 | Balla et al. |
| 8,570,320 B2 * | 10/2013 | Izadi et al. ............... 345/420 |
| 8,587,583 B2 * | 11/2013 | Newcombe et al. ......... 345/420 |
| 2002/0055384 A1 | 5/2002 | Armstrong |
| 2003/0083957 A1 | 5/2003 | Olefson |
| 2003/0214400 A1 | 11/2003 | Mizutani et al. |
| 2004/0021569 A1 * | 2/2004 | Lepkofker et al. ......... 340/568.1 |
| 2004/0061646 A1 * | 4/2004 | Andrews et al. ............. 342/463 |
| 2004/0233192 A1 | 11/2004 | Hopper |
| 2005/0010460 A1 | 1/2005 | Mizoguchi et al. |
| 2005/0264558 A1 | 12/2005 | Vesely et al. |
| 2005/0267900 A1 | 12/2005 | Ahmed et al. |
| 2006/0009862 A1 | 1/2006 | Imhof et al. |
| 2006/0029256 A1 | 2/2006 | Miyoshi et al. |
| 2006/0044307 A1 | 3/2006 | Song |
| 2006/0061752 A1 | 3/2006 | Solomon et al. |
| 2006/0073455 A1 | 4/2006 | Buyl et al. |
| 2006/0265664 A1 | 11/2006 | Simons et al. |
| 2007/0001904 A1 | 1/2007 | Mendelson |
| 2007/0139269 A1 * | 6/2007 | Chen et al. ................. 342/450 |
| 2007/0201421 A1 | 8/2007 | Huseth |
| 2007/0205886 A1 | 9/2007 | Huseth et al. |
| 2007/0239350 A1 | 10/2007 | Zumsteg et al. |
| 2007/0239352 A1 | 10/2007 | Thota et al. |
| 2007/0279210 A1 | 12/2007 | Li et al. |
| 2008/0033645 A1 | 2/2008 | Levinson et al. |
| 2008/0040669 A1 | 2/2008 | Plocher et al. |
| 2008/0062167 A1 | 3/2008 | Boggs et al. |
| 2008/0068267 A1 | 3/2008 | Huseth et al. |
| 2008/0077326 A1 | 3/2008 | Funk et al. |
| 2008/0122696 A1 * | 5/2008 | Huseth et al. ................. 342/464 |
| 2008/0158256 A1 | 7/2008 | Russell et al. |
| 2008/0215524 A1 | 9/2008 | Fuchs et al. |
| 2008/0220780 A1 | 9/2008 | Huseth et al. |
| 2008/0228039 A1 | 9/2008 | Huseth et al. |
| 2009/0040175 A1 | 2/2009 | Xu et al. |
| 2009/0043504 A1 | 2/2009 | Bandyopadhyay et al. |
| 2009/0044808 A1 | 2/2009 | Guney et al. |
| 2009/0046140 A1 | 2/2009 | Lashmet et al. |
| 2009/0102642 A1 * | 4/2009 | Huseth et al. ............ 340/539.13 |
| 2009/0102711 A1 * | 4/2009 | Elwell et al. ............. 342/357.06 |
| 2009/0105006 A1 | 4/2009 | Doyle |
| 2009/0216438 A1 * | 8/2009 | Shafer ........................ 701/210 |
| 2009/0216775 A1 * | 8/2009 | Ratliff et al. .................... 707/10 |
| 2009/0265104 A1 | 10/2009 | Shroff |
| 2009/0298024 A1 | 12/2009 | Batzler et al. |
| 2009/0307255 A1 | 12/2009 | Park |
| 2010/0057354 A1 | 3/2010 | Chen et al. |
| 2010/0121567 A1 | 5/2010 | Mendelson |
| 2010/0299065 A1 | 11/2010 | Mays |
| 2011/0059698 A1 | 3/2011 | Huseth et al. |
| 2011/0082643 A1 | 4/2011 | Huseth et al. |
| 2011/0112875 A1 * | 5/2011 | Johnson et al. ............... 705/7.11 |
| 2011/0137549 A1 | 6/2011 | Gupta et al. |
| 2011/0153279 A1 | 6/2011 | Zhang et al. |
| 2011/0164768 A1 | 7/2011 | Huseth et al. |
| 2011/0248847 A1 * | 10/2011 | Huseth et al. ............ 340/539.13 |
| 2011/0268300 A1 | 11/2011 | DeMars et al. |
| 2011/0270584 A1 | 11/2011 | Plocher et al. |
| 2011/0270654 A1 | 11/2011 | Banerjee et al. |
| 2011/0276264 A1 | 11/2011 | Plocher et al. |
| 2011/0285851 A1 | 11/2011 | Plocher et al. |
| 2012/0130632 A1 | 5/2012 | Bandyopadhyay et al. |
| 2012/0143495 A1 | 6/2012 | Dantu |
| 2012/0169530 A1 * | 7/2012 | Padmanabhan et al. ....... 342/146 |
| 2012/0173247 A1 | 7/2012 | Padmanabhan et al. |
| 2012/0194517 A1 * | 8/2012 | Izadi et al. ..................... 345/420 |
| 2012/0319903 A1 * | 12/2012 | Huseth et al. ................. 342/386 |

FOREIGN PATENT DOCUMENTS

| | | |
|---|---|---|
| JP | 11317936 | 11/1999 |
| JP | 2001356813 | 12/2001 |
| JP | 2005242531 | 9/2005 |
| JP | 2005311563 | 11/2005 |
| JP | 2007183432 | 7/2007 |
| JP | 2007333998 | 12/2007 |
| WO | 9210953 A1 | 7/1992 |
| WO | WO 2005/033912 | 4/2005 |
| WO | 2005040989 A2 | 5/2005 |
| WO | 2009029834 A1 | 3/2009 |
| WO | 2009071919 A1 | 6/2009 |
| WO | 2010107379 | 9/2010 |

OTHER PUBLICATIONS

Walker et al., "Development and Evaluation of a System for Wearable Audio Navigation," Proceedings of the Human Factors and Ergonomics Society 49th Annual Meeting, pg. 1607-1609, 2005.

Davies et al., "Scalable, Distributed, Real-Time Map Generation," IEEE, Intelligent Transport Systems, pp. 47-54, 2006.

(56) References Cited

OTHER PUBLICATIONS htttp://www.sara.com/ISR/low_frequency_EM/magnetic_communication.html, "Magnetic Communications," 2 pages, Jun. 27, 2011.
Matsumoto, "Real-Time Multi-Sensor Localisation and Mapping Algorithms for Mobile Robots," 309 pages, 2009.
Yagi et al., "Real-Time Generation of Environmental Map and Obstacle Avoidance Using Omnidirectional Image Sensor with Conic Mirror," IEEE, pp. 160-165, 1991.
"Incident Management IPT Requirements BAA for Topics Related to Geospatial Location Accountability and Navigation System for Emergency Responders (GLANSER)," Broad Agency Annoucement BAA09-02, pp. 1-34, Jan. 23, 2009.
Baronski, "New Sensor Signal Processor Paradigms: When One Pass Isn't Enough," HPEC, 19 pages, 2008.
Budroni et al., "Automated 3D Reconstruction of Interiors from Point Clouds," International Journal of Architechtural Computing, vol. 8, Issue 1, pp. 55-74, Mar. 2010.
Cinaz et al., "HeadSLAM —Simultaneous Localization and Mapping with Head-Mounted Inertial and Laser Range Sensors," IEEE pp. 3-10, 2008.
U.S. Appl. No. 13/538,677, filed Jun. 29, 2012.
Davison, "Real-Time Simultaneous Localisation and Mapping with a Single Camera," Proceedings of the Ninth IEEE International Conference on Computer Vision, pp. 1-8, 2003.
Fischer et al., "Location and Navigation Support for Emergency Responders: A Survey," IEEE CS, pp. 38-47, 2010.
Henke, "The Table Metaphor: A Representation of a Class and Its Instances," pp. 93-98, prior to Dec. 23, 2009.
Honeywell, "Excel Building Supervisor-Integrated R7044 and FS90 Ver. 2.0," Operator Manual, 70 pages, Apr. 1995.
Honeywell, "Precision Indoor Personnel Location and Tracking for Emergency Responders," 20 pages, Aug. 3-4, 2009.
http://kpogre.sourceforge.net/tutorial03/index.html, "Create Tabe Using Wizard," 8 pages, printed Oct. 18, 2009.
http://uic.edu/depts/accc/seminars/access2000-intro/tables.html, "Creating Tables with the Table Wizard-Access 2000 Introduction," 3 pages, Oct. 18, 2009.
http://www.firerescue1.com/printasp?act=print&vid=405845, "3-D Locator Featured at Washington Tech. Demonstration," 3 pages, Jun. 20, 2008.
Johnston et al., "Estimating Building Floor-Plans From Exterior Using Laser Scanners," SPIE IS&T vol. 6805, 11 pages, 2008.
Kumar et al., "Robot and Sensor Networks for First Responders," IEEE CS and IEEE ComSoc, pp. 24-33, Oct.-Dec. 2004.
Le et al., "Ultrawideband (UWB) Radar Imaging of Building Interior: Measurements and Predictions," IEEE Transactions on Geoscience and Remote Sensing, vol. 47, No. 5, pp. 1409-1420, May 2009.
Rashidi, "Smart Home Adaptation Based on Explicit and Implicit User Feedback," 166 pages, Dec. 2007.
Rau et al., "Geometrical Building Modeling and Its Application to the Ortho-Rectification for Aerial Images," Journal of Photogrammetry and Remote Sensing, vol. 9, No. 1, pp. 53-76, Mar. 2004.
Sacks et al., "A Project Model for an Automated Building System: Design and Planning Phases," Automation in Construction, vol. 7, pp. 21-34, 1997.
Snavely et al., "Modeling the World from Internet Photo Collections," International Journal of Computer Vision, vol. 80, Issue 2, pp. 189-210, 2008.
Trane, "System Programming, Tracer Summit Version 14, BMTW-SVP01D-EN," 623 pages, 2002. (This reference will be uploaded in 3 parts).
Wang et al., "Camera Localization and Building Reconstruction from Single Monocular Images," 8 pages, 2008.
www.automatedbuildings.com/news/may10/articles/lavelleenergy/100427104606lavelle.htm, "Virtual Building Energy Management Moving to Cloud-based Building Energy Management," 7 pages, May 2010.

* cited by examiner

PORTABLE HOUSINGS FOR GENERATION OF BUILDING MAPS

This application claims the benefit of U.S. Provisional Application Ser. No. 61/428,530, filed Dec. 30, 2010, entitled "Real Time Map Generation Using Location and Tracking Data," which is herein incorporated by reference.

BACKGROUND

In the event of a fire or other emergency, emergency workers may arrive at the scene without complete knowledge of the interior layout or interior condition of the building. Blueprints for the building may be available in some cases, but they may not reflect recent changes to the building's interior. In addition, the interior of the building may have dangerous conditions, with some locations or corridors beings blocked or impassable.

Location and tracking systems have become relatively common through the use of the Global Positioning System (GPS) and advanced asset tracking technologies. Many of these systems allow precise real-time positioning of a person or asset within a coordinate space with reasonable accuracy. Typically, this information is presented to a user by showing the person or asset of interest on a map that has been precisely constructed and calibrated to be used with the location system. However, in many situations, the map is either not readily available, was never constructed, or is incorrect. In such cases, presenting the location information of the person or asset of interest so that the location information can be meaningfully used becomes a significant challenge.

Accordingly, there exists a need for a building model that can dynamically incorporate additional data. Such a building model may be more accurate and more up-to-date than an existing, static model.

SUMMARY

A device and method are described for synthesizing building map data by combining information from existing static map data, data provided by persons on the scene, and real-time sensor data using sensors specifically designed to provide physical topographical data about the environment in which they are located. In some instances, the information from all the sources, where available, may be integrated into a single semantic building information model. In some cases, building maps and usable location and position information can be derived from the building information model and displayed to a user. In some cases, new information that is accumulated and derived dynamically may also be added to the model.

DESCRIPTION

Figure 1:
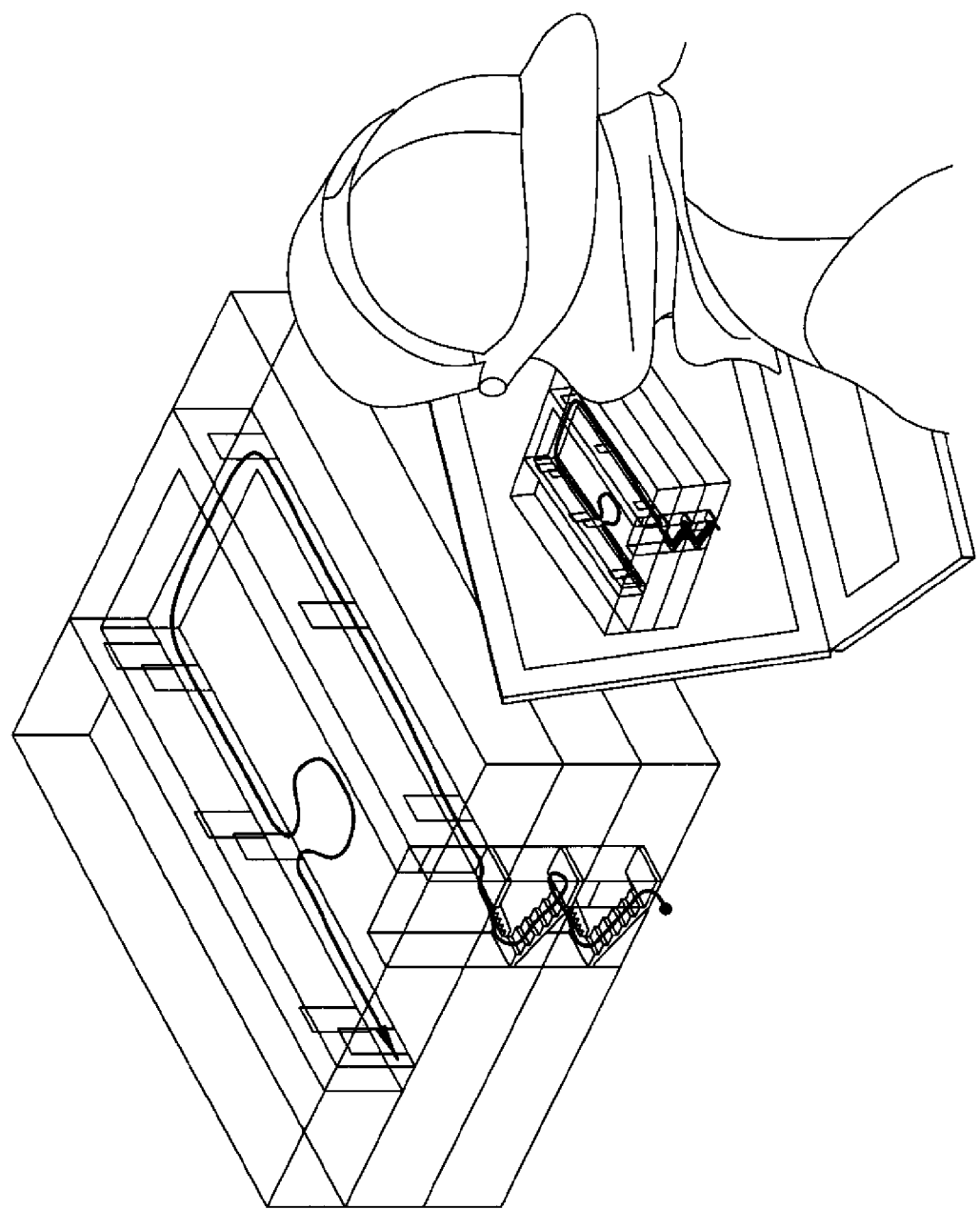
FIG. 1 is an overview drawing of an illustrative map generation system.

In the following description, reference is made to the accompanying drawings that form a part hereof, and in which is shown by way of illustration specific embodiments which may be practiced. These embodiments are described in sufficient detail to enable those skilled in the art to practice the disclosure, and it is to be understood that other embodiments may be utilized and that structural, logical and electrical changes may be made without departing from the scope of the disclosure. The following description of example embodiments is, therefore, not to be taken in a limited sense, and the scope of the present disclosure is defined by the appended claims.

The functions or algorithms described herein may be implemented in software, hardware, a combination of software and hardware, and in some cases, with the aid of human implemented procedures. The software may include computer executable instructions stored on computer readable media such as memory or other type of storage devices. Further, such functions may correspond to modules, which are software, hardware, firmware or any combination thereof. Multiple functions may be performed in one or more modules as desired, and the embodiments described are merely examples. The software may be executed on a digital signal processor, Application Specific Integrated Circuit (ASIC), microprocessor, or a computer system such as a personal computer, server or other computer system, but these are just examples.

A system and method are presented for producing a model of the interior of a building. In some instances, the model is capable of receiving and dynamically incorporating input from various sources, including existing static map data, data such as annotations and updates provided by persons on the scene but outside the building, and/or real-time data from sensors located on mobile persons or assets that are dynamically moving inside the building. In some cases, the moving persons or assets inside the building may carry or may be attached to units that emits sound or electromagnetic pulses, which reflect off the immediate surroundings in a particular room or portion of the building, and sense the reflected pulses. The reflections from relatively close features arrive at the sensor more quickly than those from relatively distant features, so that temporal analysis of the reflected pulse may provide information about features in the building as a function of their distance away from the unit. Pulses are emitted and received at multiple locations in the room or portion of the building as the user moves about the building. The reflected pulses are analyzed, using specific time shifts that correspond to round-trip travel times in particular directions relative to the direction of movement of the units, so that the actual locations of features may be identified. By walking from room-to-room throughout the interior of a building and performing such analysis, much or all of the interior of a building may be mapped and displayed.

In some cases, the building model may be used to assist firefighters or other emergency personnel. For example, a fire truck may arrive at a building with firefighters who are unfamiliar with the interior of the building. In some cases, the fire truck may include a vehicle-based unit, which may include a display, a way to enter data, such as a keyboard, mouse and/or a touch-sensitive screen, and a way to communicate wirelessly with one or more portable units that may be attached to or carried by respective firefighters as they walk around the interior of the building. In some cases, the vehicle-based unit can accept static map data, can accept input from people at the scene, such as building managers, witnesses or emergency personnel that can enter information surmised from the exterior of the building, and can accept input from the portable units as the respective firefighters move throughout the building. Using any or all of these inputs, a dynamic map of the building may be assembled and, optionally, displayed on headsets worn by the firefighters and/or on a vehicle-based display.

FIG. 1 is an overview drawing of a map generation system 10. Such a system 10 may be employed to assist firefighters, who need as much current information as possible about the interior of a burning building. Existing plans or blueprints, which may have been drawn up when the building was built, may provide a rough idea of the building's layout, but may be obsolete from modifications over time to the building. In addition, the interior of the building may be damaged from the fire, and may include portions that are damaged or impassible. Such a changing set of circumstances requires as much current information as possible, for the safety of the firefighters inside and outside the building.

In use, the map generation system 10 may include one or more users walking throughout the interior of the building. The users may be firefighters, and may help map the interior of the building by use of beacons that are attached to the firefighters. The beacons may emit signals and receive the signals that are reflected from the features in the room interiors, as further detailed below.

The map generation system 10 may also include one or more users outside the building. These users may monitor the progress of the interior user or users, and may act to coordinate their locations inside the building. This external user may view the most current map on a computer screen that remains generally stationary, such as on a unit attached to or contained within a fire truck. The view presented on the screen may be controllable, so that the user may see parts of the interior of the building as needed, and may appropriately direct the users inside the building.

In general, the map generation system 10 may arrive at the scene with the first responders, typically on the fire truck, and may use a pre-existing map as its starting point, such as a set of blueprints that may be read electronically or may be scanned into the system 10. The map generation system 10 may then dynamically accept input from the users as they walk around the interior of the building, and may also dynamically accept input entered through the generally stationary unit on the truck. The map generation system 10 may integrate all of the inputs in real time, or as close to real time as possible, so that the most current map of the building's interior is available for viewing on the stationary unit's screen and/or on headsets worn by the users inside the building. Note that the headsets inside the building may be especially useful, in that they may provide helpful navigation for the users if there is significant smoke inside the building or if the building's lighting system has been damaged.

The building model or information model described herein may receive input from one or more of at least five sources including, but not limited to: (1) static data, (2) heuristics, (3) learning, (4) sensors and (5) user input. Each of these five sources is discussed briefly.

Regarding static data, the building model may incorporate any or all of pre-existing maps, site maps, footprint size, number of floors, building inspection documents, tax documents, utility layout documents, and/or hazardous chemicals or areas. In all of these cases, the static data is already existent, as opposed to generated on the fly, and is typically accessible through wired or wireless communications, such as the Internet.

Regarding heuristics, a sensor carried by or attached to a user may be able to recognize particular traits or tasks from a motion pattern recognized by the sensor. For instance, a sensor may recognize climbing stairs, moving up or down ramps, or stepping over debris, each of which has a characteristic pattern of motion that may be recognized by the sensor. Such heuristics may be detected by accelerometers, gyros, triangulation via radio signals, gps signals, etc.

Regarding learning, the building model or the system that uses a building model to form a map of the building, may adapt using previously discovered information.

Regarding sensors, one or more sensors may be attached to or carried by respective users. In some cases, a sensor will be attached to a user, and the user may walk or run throughout the building, in an attempt to create a current map of the interior features in the building. Each sensor may be able to detect its own orientation and/or position within the building, as well as paths and corners, entry and exit points from closed rooms, and discovery of obstructions that may not be present on any static maps. There is more detail below regarding the sensors and an algorithm for determining the building features in proximity to the sensors.

Regarding user input, in some cases it may be possible for users to enter items directly into the building model. The user may be inside the building, such as walking or running through the building, or may be outside the building, such as in or near a fire truck. The model may accept correction of data from visual inspection, may accept annotation of unsensed information, such as deployment of resources or hazardous areas, and/or may accept addition of basic information that is otherwise unavailable, such as a wireframe model, the number of floors of the building, and/or an estimated length and width of the building.

The building map model described herein can incorporate topographic information from any or all of the five above-listed sources, or other sources, but there is particular attention devoted below to real-time data from sensors located on mobile persons or assets that are moving through the building. This information, from all the available sources, may be integrated into a single building information model that provides sufficiently rich semantics to help ensure that the single representation is as complete and consistent as possible. Each object in the building information model such as a door, staircase, or window may contain information about its size, its placement in the building, and what it is connected to. Once the model has been constructed, operations such as displaying maps of the building, determining adjacency, and scaling objects to their proper size are possible. As new information is accumulated and derived dynamically, that information may be added to the model, further enhancing the completeness of the building map.

Building information models ("BIM") have existed for some time and are described in the literature. The model described herein uses a BIM to combine information derived from multiple data sources into a consistent representation of the building. When available, and in some illustrative embodiments, the initial source of building data is maps or other static data that have been created by the original architect, used for reconstruction and renovation, or used by various trades such as electrical and plumbing. These maps may also come from a number of sources such as satellite images (Google Earth), county building records, and tax real estate records and provide basic information from floor plans, building floor space, number of rooms, etc. These maps and data are typically in printed form with minimal semantic information as to positioning and alignment. Tools have been described in the literature that are able to process the printed map information and derive the corresponding BIM data. Processing graphical floor plan images is well understood and includes recognizing lines and edges as well as other specific architectural concepts such as stairs, elevators, doors, windows, etc. Recognizing these constructs in the map allows them to be added to the BIM relatively automatically, thereby enhancing the richness of the building model. It is recognized that in many cases, such building maps do not exist or are unavailable. When the maps are available, they may be out of date and not contain critical building changes that have been made such as walls, stairways and other key building structures.

To address these and other deficiencies, a second source of building information may be used. In some cases, drawing tools are provided to persons on the scene that allow the person to correct and extend information that exists. The tools may also help define rough building attributes, such as number of floors, a length and width of the building, and placement of doors and windows. Such a drawing tool may include choosing objects from a palate of building constructs and placing them on the display (e.g. drag and drop). Additional on site data may be provided automatically using camera images on the scene that may be able to automatically estimate the number of floors and the rough size of the building from an external view. In cases where no initial building map exists, the building structure provided by the person on the scene may be the principal manner in which the building is initially rendered. When a building map has already been integrated into the BIM, the user typically is able to augment and enhance the existing features and delete features that are incorrect.

A third source of information may come from sensors worn by persons or mobile devices operating in the building. As persons carry out their normal duties moving through various sections of the building, topographical elements may be discovered. These sensor packages may include an inertial measurement unit (IMU), which can measure rotation and acceleration, and radar, which can detect objects and obstructions in the vicinity. The IMU can recognize basic motions that indicate topographical map features such as climbing stairs, walking straight lines down a hallway, or turning a corner. The radar may use a variety of technologies including acoustic and ultra-wide band (UWB) to detect building features by sending out short pulses that are reflected by obstructions (e.g. building features) in the area. By measuring the time the signal takes to travel to the obstruction and be reflected back, the precise distance to the obstruction may be calculated. This pulse may be acoustic as with ultrasonic where the speed of sound is used, or electromagnetic as with UWB where the speed of light is used.

In some instances, collecting topographical information from sensors is dependent on maintaining position information. The position information may allow the topological objects that are sensed to be correctly placed within the BIM. Such a high performance navigator may be dependent on the same sensors of IMU and UWB radar to determine its position, which may allow these sensors to provide both position determination as well as building discovery.

An exemplary method for dynamically producing the building model is as follows. The model may retrieve incomplete building data from one or more predetermined static maps, and may incorporate the incomplete building data into the model. In some cases, the model may accept building data entered through a predetermined drawing tool exterior to the building, such as building floor space, number of rooms, location of walls, location of stairs, location of elevators, location of doors, location of windows and connections between rooms. In some cases, additionally entered data may override one or more incorrect items from the static map.

The model may also receive in additional building data generated in real time from one or more housings affixed to respective users walking through the building, and may incorporate the additional building data into the model in real time. In some cases, each housing may emit acoustic or electromagnetic signals that reflect off features in the building proximate the respective housing, and may receive the reflected signals. The model may form a dynamic visual representation of the building from the model in real time, and may display the visual representation of the building in real time, optionally with each display dynamically mimicking a point of view of each respective user.

An exemplary device for aiding in dynamically producing the building model may include one or more portable units, which are carried by or attached to respective users as they walk throughout the interior of the building, and one or more remote units, which remain outside the building and can communicate wirelessly with the portable units. The remote units may be vehicle-based units in some cases (e.g. located on fire truck). The remote units may have incomplete interior map data, which may be dynamically supplemented by data from the portable units. Each portable unit may emit signals that reflect off interior features of the building and may receive the reflected signals. In some cases, a display of the remote unit may be switchable between a point of view of the remote unit, looking at the building from its exterior, and a point of view of a user as the user walks throughout the interior of the building. In some cases, the remote units may be in wireless communication with a central unit, sometimes via the Internet. The central unit may serve as a database that supplies map information, and/or may perform calculations for the building model.

Figure 2:
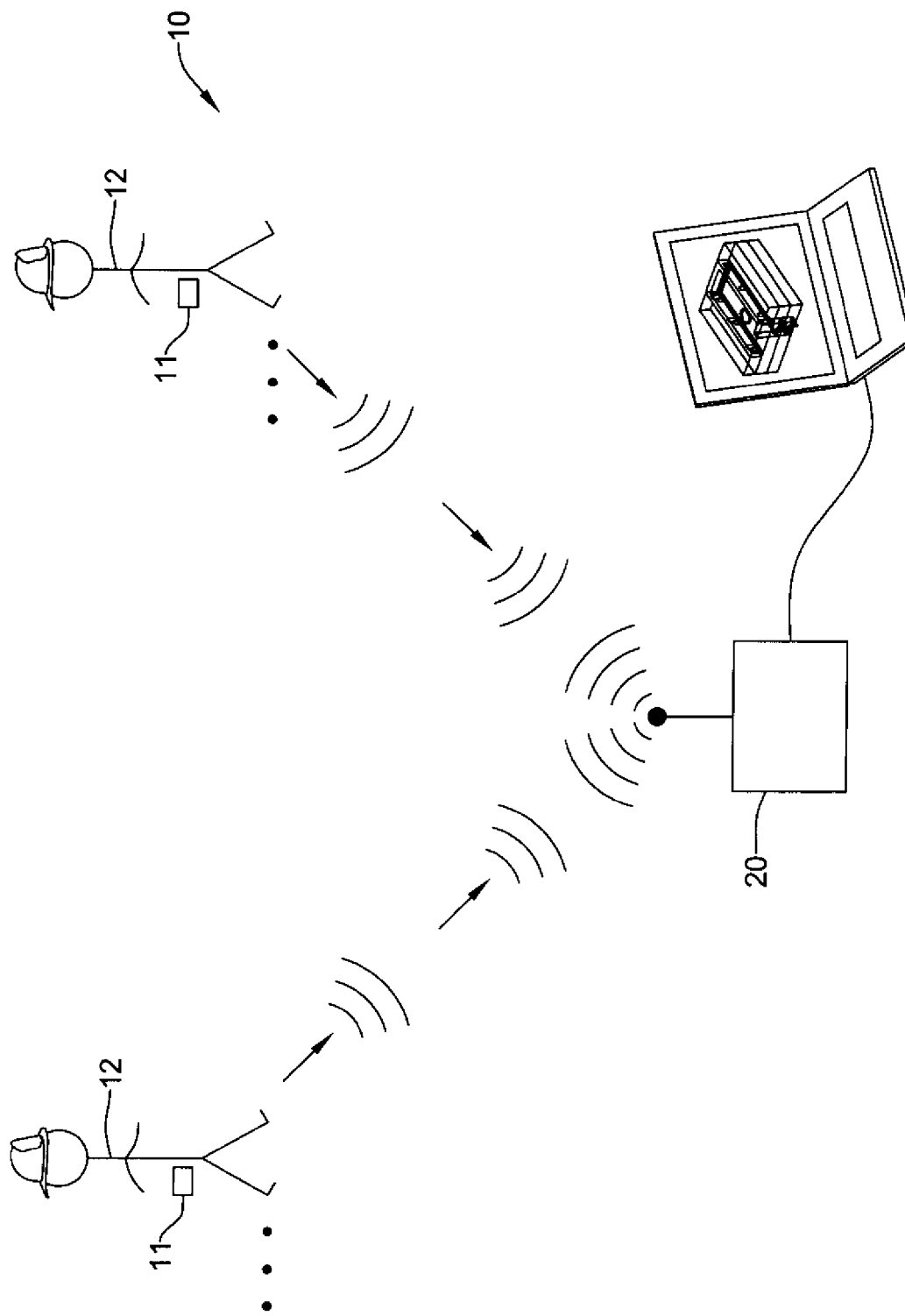
FIG. 2 is a schematic drawing of two example users in the map generation system of FIG. 1.

FIG. 2 is a schematic drawing of two example users 12 in the map generation system 10 of FIG. 1. In some cases, the users 12 may be firefighters, who may be walking through different parts of the same building in an effort to fight the fire and/or map out the full interior of the building. Each user 12 may have a respective housing 11 affixed to the user 12. Each housing 11 may be able to discern some or all of the building features in its proximity through a series of emitted and received pulses.

The housings 11 may be in wireless communication with a central receiver 20 that may receive signals sent from the various housings 11. These signals sent to the central receiver 20 may be one-way signals, so that they are sent from the housings 11 and received by the central receiver 20; the central receiver 20 typically does not send signals to the housings 11. In other cases, the central receiver 20 may additionally send signals to the housings 11.

The transmissions shown in FIG. 2 may include the present or recent locations of the particular housings, so that the central receiver may monitor their locations within the building. In some cases, the transmissions may also include the raw reflected pulses (details below), which may be interpreted by the central receiver 20 and converted into building features that can be dynamically incorporated into the building map. In other cases, the individual housings 11 may perform the interpretation of the reflected pulses internally, and may transmit the building features to the central receiver 20, which may then be dynamically incorporated into the building map.

The central receiver 20 may be a computer, such as a laptop or tablet computer, and may include a screen viewable by a user stationed with the central receiver 20, typically on or near the truck. In some cases, the central receiver 20 may perform some or all of calculations internally, or may allow a remote computer to perform some or all of the calculations, as desired.

Figure 3:
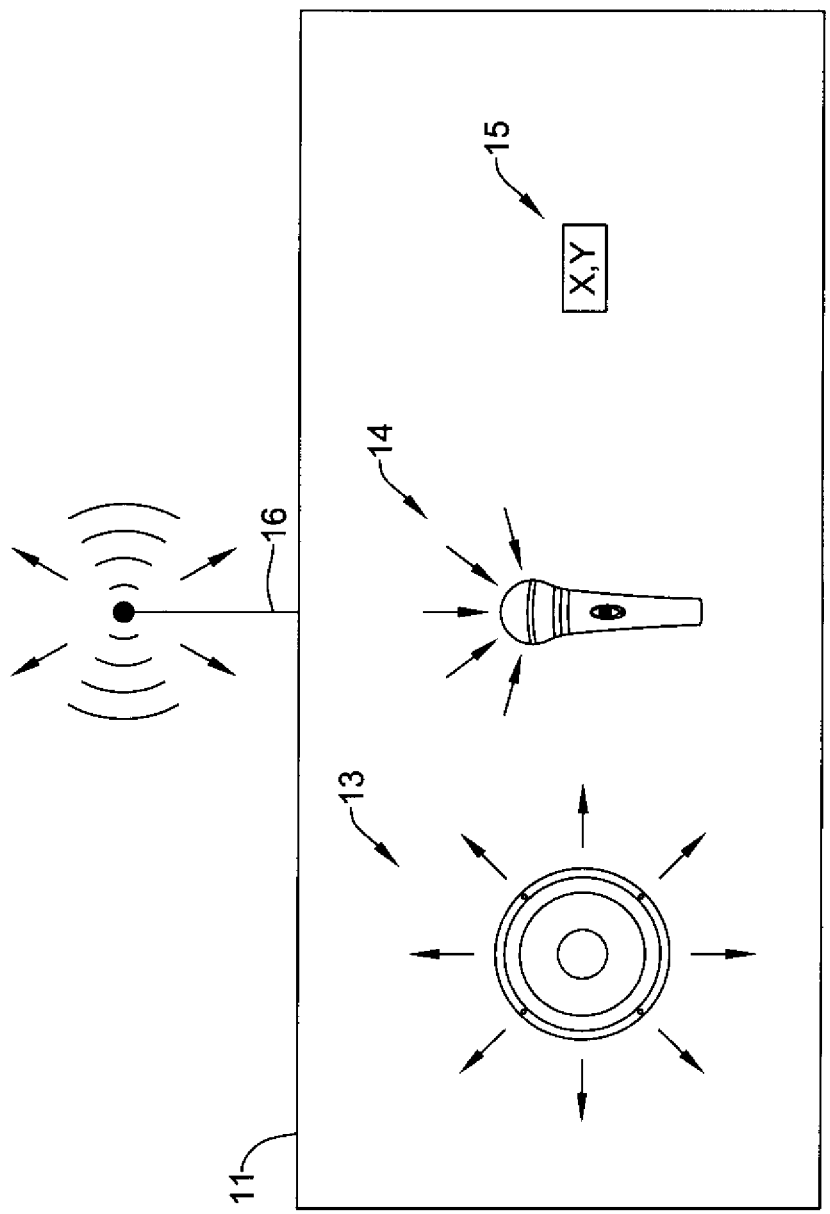
FIG. 3 is an example of a housing from the map generation system of FIG. 1.

FIG. 3 is an example of a housing 11 from the map generation system 10 of FIG. 1. Each housing 11 may have a beacon 13, which may emit pulses three dimensionally away from the housing 11 toward the building features proximate the housing 11. In FIG. 3, the beacon 13 is drawn as a speaker, which may emit acoustic or sound pulses. The sound pulses may travel through smoke relatively easily, and may reflect or scatter from walls and other solid features within the building.

Each housing 11 may also have a sensor 14, which may receive the pulses emitted from the beacon 13 and reflected from the various features in a particular room or portion of the building. In FIG. 3, the sensor 14 is drawn as a microphone, which may receive sound pulses.

As an alternative, the beacon 13 may emit electromagnetic pulses, with one or more wavelengths that are largely transparent through smoke but largely reflect from walls and other solid features within the building. Likewise, the sensor 14 may received the reflected electromagnetic pulses. The time-of-flight effects are essentially the same as for sound pulses, but the velocity of light is much larger than that of sound.

Each housing 11 may have a locator 15 or locating device 15 that provides two-dimensional or three-dimensional location coordinates of the housing 11 at or near the time that each pulse is emitted from the beacon 13. The housing 11 may use time-of-flight delays between the transmitted and reflected pulses to determine the locations of the building features, and it is implicitly assumed that the speed of sound is significantly larger than the speed at which the user walks through the building. As far as the locator 15 is concerned, there is little or no error in assuming that the pulses are emitted from and received at the same locations, denoted by (x,y) in FIG. 3. It is also implicitly assumed that the building and room features remain generally stationary while the measurements are taken.

In some cases, the locator 15 may use triangulation from ground-based and/or satellite-based signals to determine its location. For example, the locator 15 may use the Global Positioning System (GPS). However, use of these triangulation-based locators may have drawbacks in that triangulated signals may not reach through the various layers of concrete, brick or metal to the interior of the building. For instance, inside a stairwell, there may not be enough GPS signal to produce a reliable location.

As an alternative, or in addition to, the locator 15 may use an accelerometer-based locating algorithm to supplement or replace a triangulation-based algorithm. The locator 15 may include one or more accelerometers, which can provide acceleration values in real time, in the x, y and z directions. Note that acceleration is the second derivative of position, with respect to time. If the locator 15 starts at a known location, then knowing the acceleration as a function of time as well as the time, subsequent to being at the known location, may provide subsequent velocity and position values, as a function of time. Note that velocity is the first derivative of position, with respect to time.

Each housing 11 may also have a transmitter 16 for transmitting the location and reflected pulse information to, for example, the central unit 20. In general, the entire housing 11 may be small enough to be strapped to or otherwise secured to a firefighter, without undue encumbrance. The housing 11 may include sufficient battery power to provide uninterrupted use for a predetermined length of time, such as an hour to two.

Once the housing 11 is attached to (or carried by) the user, the housing 11 may begin to emit a series of sonic or electromagnetic pulses from the beacon 13. Such pulses may be periodically timed with a regular spacing, if desired.

Figure 4:
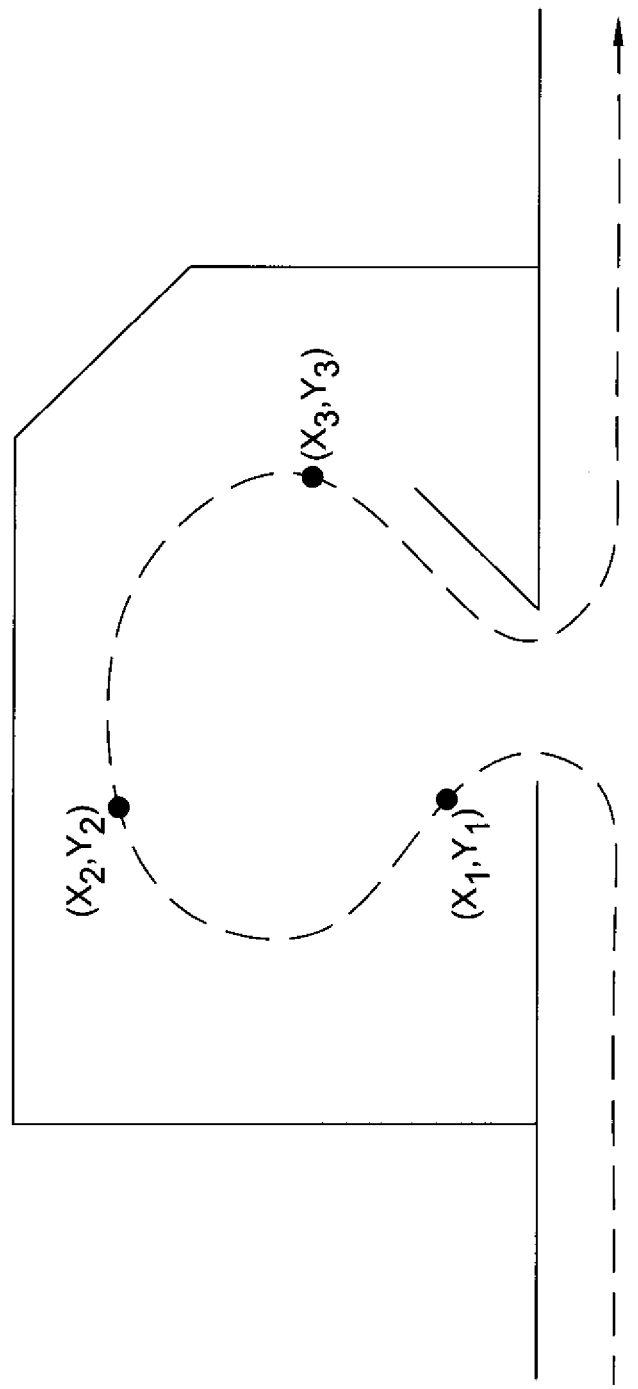
FIG. 4 is an example of a path taken by a user inside a room for the map generation system of FIG. 1.

A path taken by a user inside an example room in the building is shown in FIG. 4. The user may enter the room, walks a bit within the room, and exits the room, preferably as quickly as possible because the building may be on fire. In general, in order to be able to map out all the two-dimensional features (walls) in the room, the housing 11 should emit and receive at least three pulses within the room, where the locations of the housing at the time of the pulses do not fall on a single line. In general, the farther apart the emission/reception locations are in both x- and y-directions, the higher the signal-to-noise ratio will be in the measurements. Although three sets of pulses may be used as a minimum, more than three sets of pulses may produce results with better resolution and/or higher signal-to-noise ratio.

Regarding the time interval between pulses, there may be two constraints in practice. In general, if the timing is too short between pulses, the round-trip time delay of one reflected pulse may overlap with the next emitted pulse, which may be undesirable. If the timing is too long between pulses, the user may have wait too long to obtain three sets of pulses within the room. Within this range of pulse timing, secondary constraints may come into play, such as resolution (driving to use as many pulses as possible) versus computing power (the housing 11 or the central receiver 20 has to process the reflected pulses to form the map features, thereby driving to use as few pulses as possible).

Figure 5:
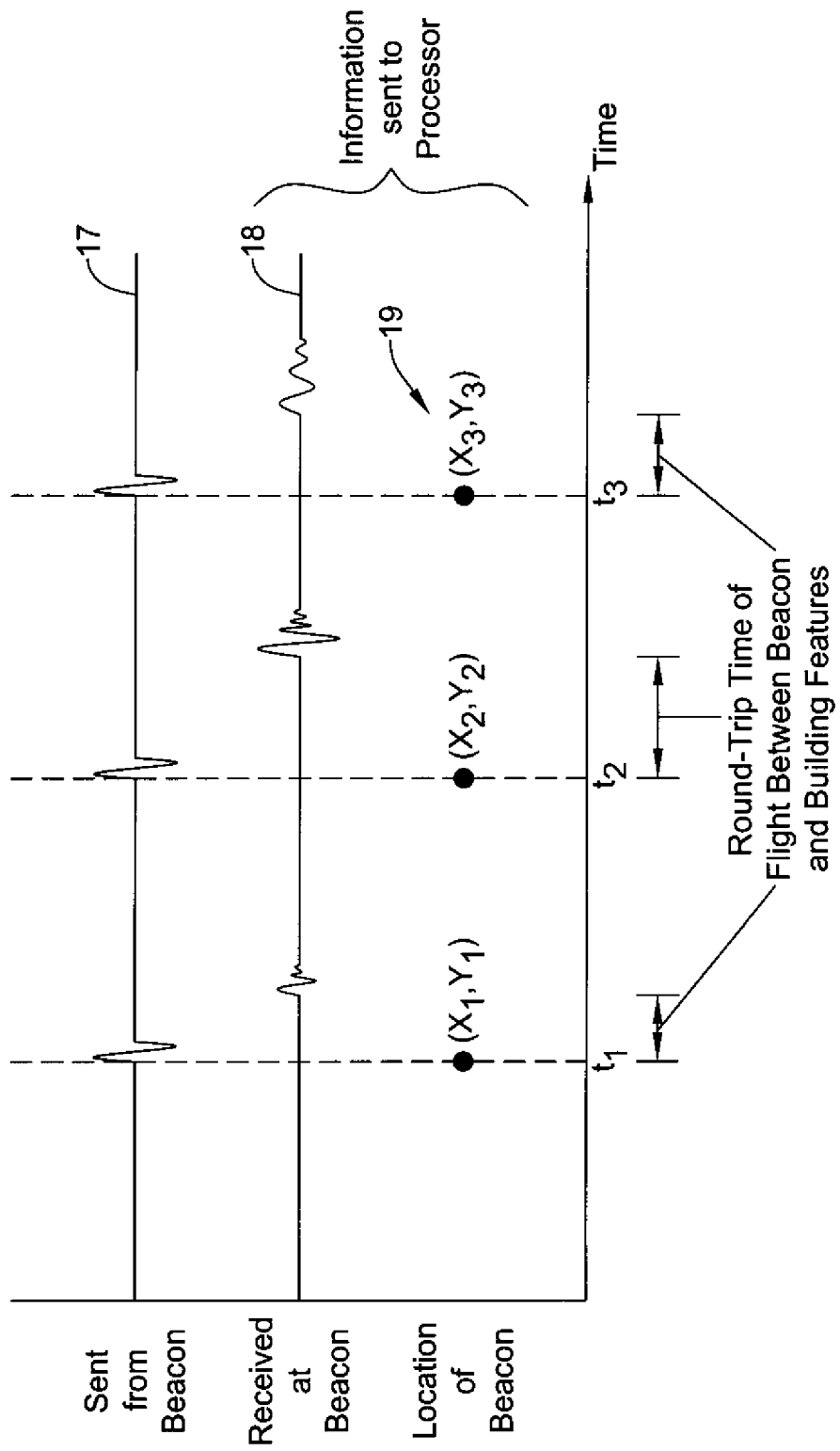
FIG. 5 is a plot of example signals sent from and received by the housing from the map generation system of FIG. 4.

FIG. 5 is a plot of example signals sent from and received by the housing 11. The illustrative pulses may be generated by the beacon 13 at times $t_1$, $t_2$, $t_3$ and so forth. In some cases, the pulses are regularly spaced, so that the time interval between $t_1$ and $t_2$ is equal to that between $t_2$ and $t_3$, and so forth, but this is not required. The pulse signal sent from the beacon 13 may be represented by element 17, which shows the sent pulse signal as a function of time.

After the pulses are generated by the beacon 13, they propagate through air (or smoke) to the various elements and features in the region proximate the housing 11, which can include a room, a hallway, a stairwell, or any other feature within the building interior. The pulses reflect off the various features, such as walls, windows, floors and so forth, and eventually return to the housing 11 after a particular round-trip time of flight. The pulses received at the housing 11 are denoted on line 18.

Note that the received pulses 18 have different appearances, pulse-to-pulse. These differences arise as the user moves around the room, and the pulses originate from different (x,y) locations in the room. Note that if the user were to remain stationary, then the received pulses would all look the same; this stationary behavior would not generate any additional information for the map. In general, it is the differences in the received pulses, from pulse-to-pulse, that provides the information about features and their locations inside the building.

The (x,y) coordinates from which the pulses are emitted and received, represented in FIG. 5 as (x1,y1), (x2,y2), (x3, y3) and so forth, are denoted by element 19.

Figure 6:
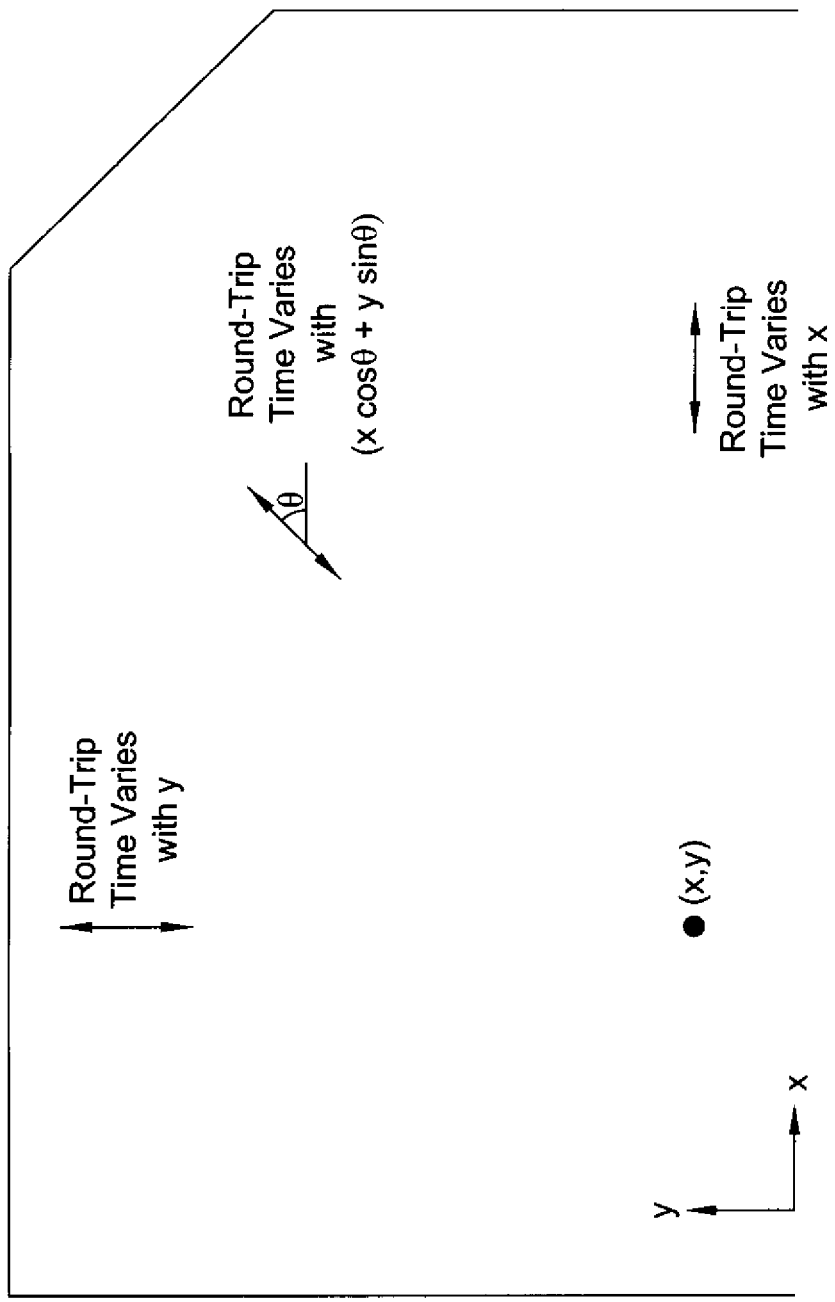
FIG. 6 shows the geometry and coordinate system for the map generation system of FIG. 4-5.

FIG. 6 shows the geometry and coordinate system for the map generation system of FIGS. 4-5. In general, the round-trip time of flight will equal the round-trip distance traveled by the pulse, divided by the speed of the pulse (for electromagnetic wave). The farther away the feature, the longer it takes for a pulse reflecting off that feature to return to the housing. As the user walks through the building, the distance to particular features may change, and the corresponding round-trip time corresponding to those features may change, pulse-to-pulse. It is this round-trip time variation, pulse-to-pulse, coupled with the variation in location at which each pulse is emitted, that helps provide the information to generate the map of the building interior.

In FIG. 6, the user sends and receives a sample pulse from location (x,y). A portion of the sent pulse travels in the positive y-direction, or "up" in the coordinate system shown in FIG. 6. The pulse reflects off the wall at the top of FIG. 6. A portion of the reflected pulse then reflects back in the negative y-direction, or "down" in FIG. 6, and returns to housing 11 at (x,y), where it is received by the sensor 14. The received pulse will see a spike at a time corresponding to the round-trip time of the pulse traveling from the beacon 13 to the wall, and from the wall back to the sensor 14.

A different portion of the sent pulse travels in the positive x-direction, or "right" in the coordinate system of FIG. 6. The pulse reflects off the wall at the right of FIG. 6. A portion of the reflected pulse then reflects back in the negative x-direction, or "left" in FIG. 6, and returns to the housing 11 at (x,y), where it is received by the sensor 14. Likewise, the received pulse will see a spike at a time corresponding to the round-trip time of the pulse traveling from the beacon 13 to the wall, and from the wall back to the sensor 14. Note that if the "top" and "right" walls are different distances away from the transmission/reception location (x,y) for the housing 11, then the received pulse will show two different spikes in time.

Similarly, for the angled portion of the wall in the upper-right of FIG. 6, which occurs at an angle θ (i.e., if one were to draw a line from the transmission/reception location to the wall, the line would form an angle θ with respect to the horizontal, or x-direction), one would see a spike corresponding to the round-trip time along the line between the transmission/reception location and the angled wall. Note that the actual angle of the wall itself is secondary to the round-trip time along the line from the transmission/reception location to the angled feature on the wall.

For the three features in FIG. 6, each feature may produce its own spike in the received pulse, with the time at which each spike occurs being related to the distance the feature is away from the transmission/reception location of the housing 11. In practice, there may be other features in the room, like furniture and cabinets, which may produce far more than three discrete spikes in the reflected pulse. The system 10 can work backwards from the reflected pulses to determine where features are in the room and in the building.

As a simple (albeit completely unrealistic) example, if the user is standing at the center of a completely spherical room, the pulse reflects from all points on the wall at the same time, and the sensor records a signal that closely resembles the emitted pulse, but delayed by a short time. The delay in this simplistic case is the round-trip time of the pulse from the beacon, to the wall, to the sensor. From the delay time, one can calculate the distance to the wall. For a round-trip delay time t and a speed of sound v, the distance to the wall is t×v/2.

In any realistic room, various features in the room are different distances away from the user. As a result, the sound that is detected at the sensor is not the pulse in its original, unreflected form, but is a "smeared-out" version of the pulse in time. The "smearing" occurs because reflections from relatively close objects reflect back to the sensor before reflections from relatively distant objects.

Mathematically, the sensed signal may be expressed as the original pulse, convolved with a relatively complicated impulse response that depends on the spatial characteristics of the room in which the pulse is emitted. The impulse response in our overly simplistic example above is a delta function (infinite amplitude, infinitesimal width) displaced from the origin by the round-trip time of our spherical room. In realistic rooms, the impulse response is generally much more complicated than a delta function.

During use, the beacon may emit pulses that reflect off the various features in the room, and the sensor may detect the reflected pulses, which are "smeared out" in time, with a "smearing" that corresponds to the relative distances away from the user of the features in the room. If the user remains stationary in the room, there is not enough information to determine a mapping of the room's features; the reflected pulses may indicate the relative distances away from the user, but do not give any indication of direction. For instance, any particular feature may be in front of the user, behind the user, or off to the side. In order to get direction information, which can provide indications of orientation in addition to distance away from the user, the user sends out and receives pulses at different locations in the room, typically by walking around the room with the beacon/sensor unit. By monitoring the location of the beacon/sensor unit, such as with a global positioning system (GPS) or other suitable position monitor, along with the detected "smeared-out" pulses from the sensor, one can map the features in the room.

Consider, as a simplistic example, a room that has just two parallel walls, which are denoted as wall A and wall B. In general, for this simplistic example, the sensor signal would show two spikes, one for wall A and one for wall B, with the time delay between the transmitted pulse and each reflected spike corresponding to the round-trip times to and from the respective walls. If the user were to step toward wall A and away from wall B, the spike corresponding to wall A would arrive earlier and the spike corresponding to wall B would arrive later. The user would then know that he or she was stepping toward wall A and away from B. Note that if the user were to step parallel to both walls, the spike arrival times would be unchanged for both wall A and wall B, and such a step would provide no new information as to where walls A and B are located.

In general, by sending/receiving pulses in at least three different locations of a room, preferably with the three locations not lying along a line, and knowing the locations at which the pulses are sent and received, one may use the received pulse signals to determine the location of objects, such as walls, in the room, and may therefore map out the room.

As a more concrete example, return to the three (x,y) locations shown in FIG. 4. For a pulse traveling in the positive y direction ("up"), then reflecting off the topmost wall and returning in the negative y direction ("down"), such a pulse would have a relatively short round-trip time to and from location "2", a relatively intermediate round-trip time to and from location "3", and a relatively long round-trip time to and from location "1". Such a wall would produce a spike relatively early in the reflected pulse for location "2", and relatively late in the reflected pulse for location "1".

Although one can set out to look for spikes at particular times, an easier and more flexible way to process the reflected pulses may be to introduce time shifts among the pulses, with each time shift having its own particular time shift at each location. In one were to compare the time-shifted pulses for a particular direction, one would see a spike at the same time in all the pulses for a feature along that direction. Such a spike, common to all or several of the pulses, indicates the location of the feature in that particular direction. The spikes may be extracted from the noise using a variety of techniques, the simplest of which is simply summing the pulses, with each pulse in the sum having its own time shift.

In other words, if one were to look away from the housing along a particular direction, one would eventually see some feature in the building, be it a wall, a door, an entryway and so forth. The round-trip time of flight from the emission/reception location to that feature would show up as a delay between the emitted pulse and the corresponding spike in the received pulse. One then sees the feature, along the same direction, from various (x,y) locations within the room. The round-trip times of flight are different at the different locations, and the delays of the corresponding spikes are different as well. To "decode" the reflected pulses, which are received at the different (x,y) locations, one may calculate the differences in round-trip times of flight between the locations themselves, and use those differences to generate appropriate time shifts for the received pulses (each particular direction having its own set of time shifts), so that if one applies the time shifts (for a particular direction), then all reflections off a feature (along a particular direction) would show up at the same time in the time-shifted reflected pulses.

Mathematically, using the coordinate system of FIG. 6 and the three emission/reception locations of FIG. 4, we may derive an expression for the time shifts (or phase shifts), as a function of direction. The direction in this geometry is given by angle θ (see FIG. 6), which is the angle formed with the x-axis (horizontal). When comparing measurement "2" (at location $(x_2, y_2)$) to measurement 1 (at location $(x_1, y_1)$), for detection of features along angle θ, one applies a time shift of:

$$2 \sin\theta[(x_2-x_1)^2+(y_2-y_1)^2]^{1/2}/v;$$

where v is the speed of the pulse, typically the speed of sound for acoustic pulses or the speed of light for electromagnetic pulses. Note that the factor of two arises from using the round-trip time of flight, rather than a single-direction time of flight. In general, each location $(x_i, y_i)$ may be assigned its own time shift according to the above formula. Each set of time shifts varies with direction, as well.

In practice, one may use the above mathematics (or other mathematics) to form a full map from the individual received pulses. One may look at a group of sent/received pulses, typically in the same room or section of the building. One designates a particular number of angles over which to analyze the group of pulses. For each angle, one may generate the time shift for each pulse using the above (or other) formula. To compare the several pulses at each angle, the received pulses may be summed, averaged, or otherwise processed to determine the closest feature for each particular angle. When the closest feature for each angle is compiled with those for the other angles, the features together can produce a map of the interior of the room or section of the building.

Note that if the user is walking while performing the measurements, the motion of the user may have little effect on the sensed pulse, because the user is presumably walking much slower than the speed of sound. In general, it is the location at which each pulse is sent and received, with spatial coordinates in x, y and z, that generally enters into the equations, and generally not the velocity.

Alternatively, the velocity may be used for calculation when the user is concerned with objects in front of him or her. Specifically, as the user advances in a particular direction, objects directly in front of the user produce reflections that have progressively shorter round-trip times back to the user. A user may take note of these objects, such as walls, and be less concerned with objects off to the side of the user. Calculation of where these objects lie may optionally use velocity information, including magnitude, direction and/or acceleration and/or rotation of the user/device.

In this manner, a user may walk from room to room in a structure, sending and receiving pulses at various locations in each room, and form an internal map of the structure, complete with room walls, door openings, and so forth. In some cases, the magnitude of the reflected signals may provide additional information, such as the size and type of material of the objects generating the reflection.

In some cases, the internal map may be displayed in real time or close to real time on a display worn by the user. Such a display may be useful for firefighters, who may have difficulty visually seeing everything in a room or structure due to smoke or other concerns. In some cases, there may be multiple users, each sending and receiving pulses, which simultaneously map out the rooms of the structure. Pertinent portions of the building map may be displayed on users' displays as the map is formed, even if some or all of the displayed map has been mapped out by someone other than the particular user.

In some cases, the locating device may use the Global Positioning System. In other cases, the locating device may use an inertial measurement unit that dynamically measures acceleration and dynamic rotation of the housing, and calculates position based on the measured acceleration and rotation. In yet other instances, impulse UWB and multicarrier UWB radios may be used to provide ranging information. Using the ranging information from 2 or more antennas with a fixed known separation may allow the creation of an angle measurement through simple trigonometry (triangulation). This angle measurement and distance can be used to track the location of the housing within the structure, sometimes in three-dimensions.

Figure 7:
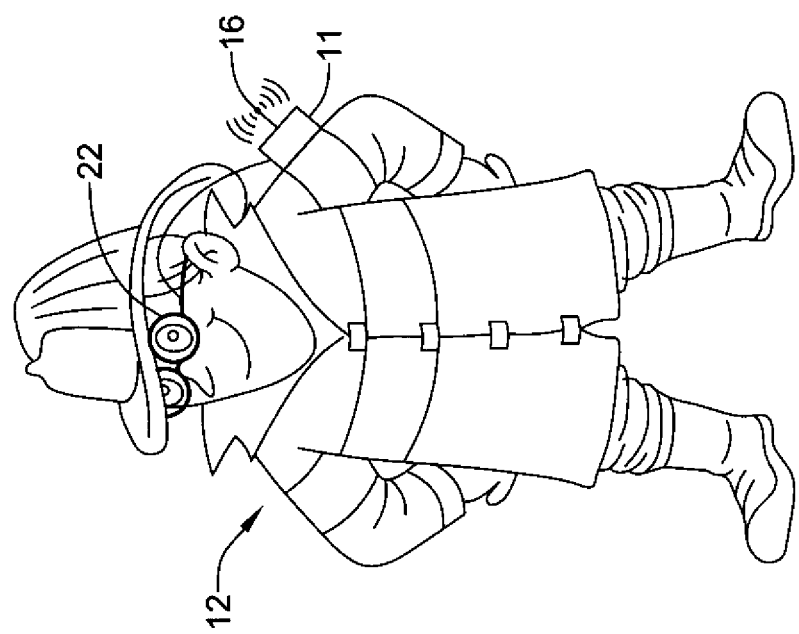
FIG. 7 is a schematic drawing of a user wearing a headset for the map generation system of FIG. 1.

FIG. 7 is a schematic drawing of a user 12 wearing a headset 22 for the map generation system 10 of FIG. 1. In the illustrative embodiment, the headset 22 may be connected to the housing 11, either by a wired or wireless connection. In some cases, the headset 22 may produce a view of the user's surroundings from the point of view of the user 12; such a view may prove useful for the user 12 if the user's location is filled with smoke. The view provided to the user 12 in the headset 22 may reflect both the most current view of the interior of the building, as determined by the system 10, and may optionally include an indication of unmapped terrain inside the room or portion of the building. Such a headset 22 may help guide the user 12 out of potentially dangerous surroundings, and may help guide the user 12 toward unmapped parts of the building for mapping. The views seen by the user 12 in the headset 22 may be generated by the housing 11, by the central receiver 20, and/or by an additional processor.

The invention claimed is:

1. A device for dynamically producing an interior map of a building, comprising:
   a housing capable of being affixed to a user as the user walks through the building;
   a beacon in the housing for emitting a series of sonic pulses proximate the housing, the emitted sonic pulses reflecting off features in the building proximate the housing to produce a series of reflected sonic pulses;
   a locating device in the housing for determining a dynamic location of the housing at or about the time the series of sonic pulses is emitted;
   a sensor in the housing for receiving the series of reflected sonic pulses, and for producing a received sonic pulse signal corresponding to at least selected emitted and received sonic pulses; and a processor for correlating the received sonic pulse signal with the corresponding housing locations, and extracting location information therefrom for at least selected features in the building.

2. The device of claim 1, wherein the features in the building are generally stationary with respect to the building.

3. The device of claim 1, wherein a delay between an emitted sonic pulse and an appearance of a corresponding reflection in the received sonic pulse signal from a particular feature varies as the round-trip time of the sonic pulse between the housing and the particular feature.

4. The device of claim 1, wherein the received sonic pulse signal varies as an emitted sonic pulse convolved with a dynamic impulse response, the dynamic impulse response depending on the relative distances between the features in the building and the dynamic location of the housing.

5. The device of claim 1, wherein as the user walks along a non-linear path so that at least three dynamic locations do not fall on a line, the processor extracts two-dimensional location information for the features in the building.

6. The device of claim 5,
wherein the processor sums the sonic pulses, each sonic pulse in the sum having its own time shift, the time shifts corresponding to particular round-trip times of flight of the corresponding sonic pulses; and
wherein a feature in a particular direction appears as a spike at a particular time in the sum of the sonic pulses.

7. The device of claim 1, wherein the beacon emits the series of sonic pulses with a regular periodicity.

8. The device of claim 1, wherein the locating device uses electromagnetic signals to generate a dynamic position of the housing, the electromagnetic signals including at least one of the Global Positioning System (GPS), cellular communication signals, television signals, or radio signals.

9. The device of claim 1,
wherein the locating device uses an inertial measurement unit that measures a dynamic acceleration of the housing and a dynamic rotation of the housing; and
wherein the inertial measurement unit calculates a dynamic position of the housing based on the measured dynamic acceleration and the measured dynamic rotation.

10. The device of claim 1, further comprising a display, the display receiving a dynamic signal from the processor and producing a viewable representation of the features in the building from the point of view of the user.

11. The device of claim 1, wherein the display is wearable by the user.

12. A system for dynamically producing an interior map of a building, comprising:
a plurality of housings capable of being affixed to respective users as the users walk independently through different portions of the building;
a beacon in each housing for emitting a series of sonic pulses proximate the respective housing, the emitted sonic pulses reflecting off features in the building proximate the respective housing;
a locating device in each housing for determining a dynamic location of the respective housing;
a sensor in each housing for receiving a series of reflected sonic pulses and for producing a received pulse signal corresponding to at least selected emitted and received sonic pulses; and
a central processor for correlating the received pulse signals at each of the plurality of housings with corresponding housing locations for each of the plurality of housings, and for extracting location information therefrom for the features in the building.

13. The device of claim 12, further comprising a plurality of displays wearable by respective users, each display receiving a dynamic signal from the central processor and producing a viewable representation of the features in the building from the point of view of the respective user.

14. The device of claim 12, wherein the features in the building are current as parts of the building are being destroyed.

15. A method for dynamically producing an interior map of a building, comprising:
emitting a series of sonic pulses from a movable housing, each sonic pulse having a corresponding housing location at which the sonic pulse is emitted, each sonic pulse expanding outward from the housing and reflecting off features in the building;
sensing the series of reflected sonic pulses at the housing;
correlating the sensed series of reflected sonic pulses with the corresponding housing location; and
analyzing the sensed series of reflected sonic pulses with their corresponding housing locations to extract a location of one or more of the features in the building, including the steps of:
forming a plurality of weightings, each weighting corresponding to a different direction relative to a direction of movement of the housing;
for each direction, calculating a plurality of round-trip time delays corresponding to the series of weightings, the round-trip time delays calculated for the series of housing locations;
for each direction, applying the plurality of time delays to the sensed series of reflected sonic pulses to obtain distance information; and
from the distance information for each direction, extracting the locations of the features in the building.

16. The method of claim 15, where the housing locations and the feature locations are both two-dimensional.

17. A method for dynamically producing an interior map of a building, comprising:
emitting a series of sonic pulses from a movable housing, each sonic pulse having a corresponding housing location at which the sonic pulse is emitted, each sonic pulse expanding outward from the housing and reflecting off features in the building;
sensing the series of reflected sonic pulses at the housing;
correlating the sensed series of reflected sonic pulses with the corresponding housing locations;
analyzing the sensed series of reflected sonic pulses with their corresponding housing locations to extract a location of one or more of the features in the building; and
moving the housing to multiple rooms in the building and performing the emitting, sensing, correlating, analyzing steps in each of the multiple rooms.

* * * * *